March 21, 1939. W. H. VAUGHAN 2,151,248
HIGH PRESSURE GAS PROCESS
Filed Aug. 12, 1938
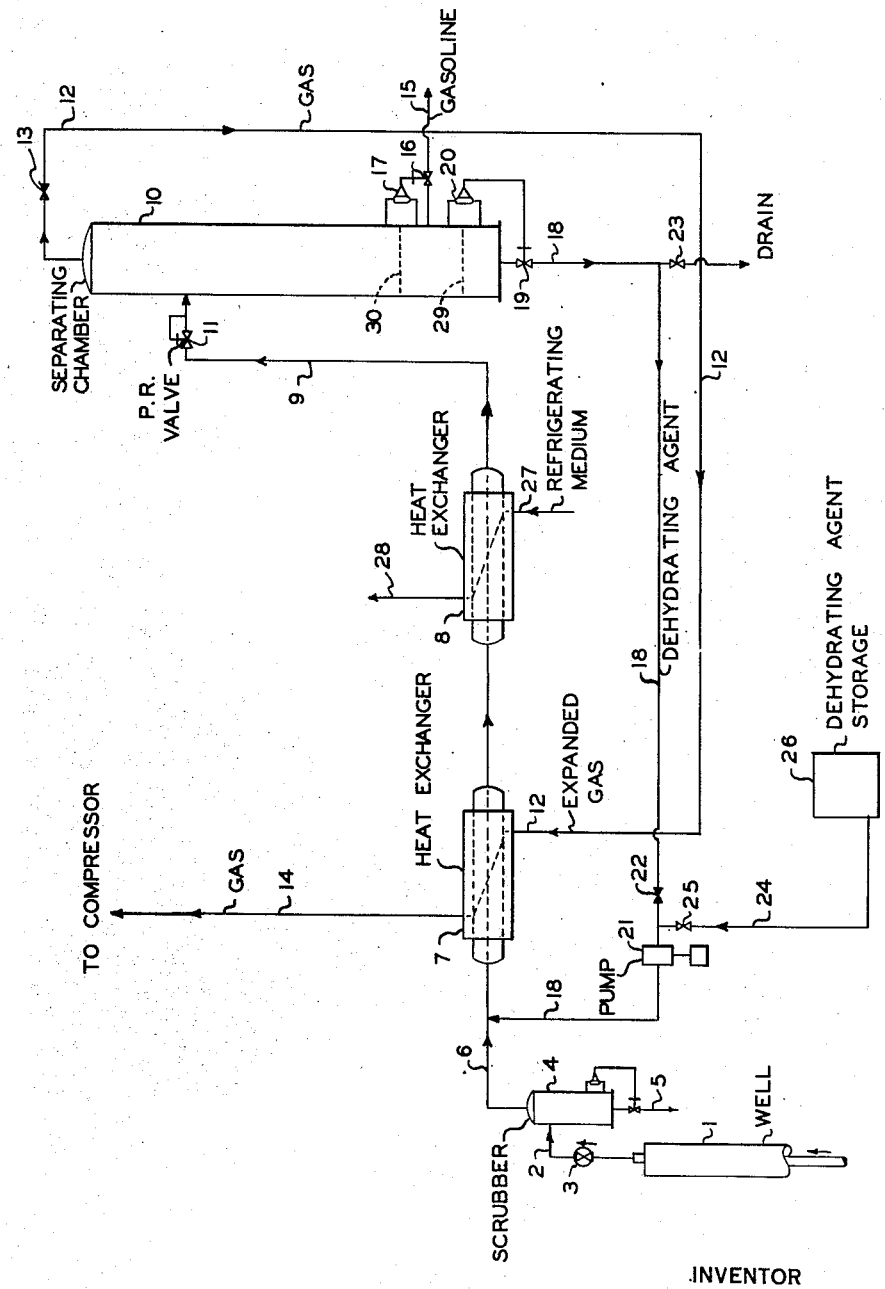
INVENTOR
WILLIAM H. VAUGHAN
BY
ATTORNEY Patented Mar. 21, 1939

2,151,248

UNITED STATES PATENT OFFICE 2,151,248

HIGH-PRESSURE GAS PROCESS

William H. Vaughan, Palestine, Tex., assignor to Tidewater Associated Oil Company, Tulsa, Okla., a corporation of Delaware, and Seaboard Oil Company of Delaware, Dallas, Tex., a corporation of Delaware Application August 12, 1938, Serial No. 224,471

10 Claims. (Cl. 62—175.5)

This invention relates to a process for the recovery of desirable liquefiable constituents from high pressure gas and particularly to a process for recovering gasoline constituents from natural gas which normally contains water or water vapor.

In my former application, Serial Number 160,192, filed August 20, 1937, now matured into Patent No. 2,133,774, issued October 18, 1938, there was disclosed a process for the recovery of desirable constituents from gas which was initially at a high pressure within the retrograde condensation range of said constituents, and specifically from gas which was at an initial pressure above 700 pounds per square inch. As disclosed in said former application, the recovery process consisted in cooling the gas sufficiently to condense the desirable constituents, while reducing the pressure substantially only within the retrograde condensation range of said constituents at the condensation temperature. This process is particularly applicable to the recovery of desirable liquefiable constituents from gas produced from high pressure gas wells, from which the raw gas is ordinarily available at the well head at pressures ranging from about 700 pounds to 3000 or more pounds per square inch. In conducting the recovery process in accordance with the invention disclosed in my earlier application, the initial pressure was reduced only a minimum amount in order to conserve to a maximum degree the initial pressure energy of the gas, whereby the gas could be returned to sub-surface reservoirs for repressuring purposes with a minimum amount of re-compression and to thus provide a process by means of which an efficient recovery of desirable liquefiable constituents was effected and the residue gas made available for return to the sub-surface reservoirs under highly economical conditions.

Thus by means of the aforementioned process, an efficient extraction of desirable liquefiable constituents could be effected while reducing the initial pressure of the gas only 200 or 300 pounds per square inch in many cases. In cooling the gas sufficiently to condense the desired constituents under the high pressures at which the process is conducted, it has been found that, due to the quantities of water present normally in natural gas, crystalline hydrates of the natural gas constituents were produced and resulted in clogging of the recovery apparatus with detrimental effects upon the efficiency of the process.

It has now been found that such detrimental hydrate formation may be efficiently controlled and prevented by certain novel steps which may be added to the afore-described recovery process. The resulting combination process forms the subject matter of this invention and constitutes a continuation-in-part of my earlier application Serial Number 160,192, referred to above.

The improved process of this invention comprises, in combination with the basic steps of my earlier invention, the additional steps of regulating the quantity of water normally contained in natural gas as it leaves the well, and dehydration of the gas being processed for the recovery of desirable liquefiable constituents to prevent or inhibit the formation of hydrates in the process.

Regulation of the quantity of water normally contained in the gas as it leaves a well is effected by regulated maintenance of the initial pressure of the gas from the well head through the processing steps to the final pressure reduction step, and the dehydration of gas during processing is effected by the injection directly into intimate mixture with the gas of a suitable dehydrating agent which is substantially immiscible with the gas constituents, all as will be more fully described hereinafter.

Therefore, it is a principal object of this invention to recover desirable liquefiable constituents from high pressure gas which normally contains water or water vapor.

Another object is to recover desirable liquefiable constituents from high pressure natural gas which is at an initial pressure within the retrograde condensation range of said constituents and which contains water or water vapor.

An additional object is to recover desirable liquefiable constituents from high pressure natural gas while dehydrating the gas to prevent or inhibit the formation of hydrates of the constituents of the gas.

Other and more specific objects and advantages of my new invention will become apparent from the following detailed description and the accompanying drawing which diagrammatically illustrates an arrangement of apparatus suitable for practicing the new invention.

Referring to the drawing, the numeral 1 designates an oil or gas well adapted to supply high pressure gas to the process. A pipe 2, in which is mounted a pressure control valve 3, leads from the top of well 1 to a field separator or scrubber 4 having a valved drain pipe 5 connected to the bottom thereof and a gas discharge pipe 6 leading from the top thereof successively through the tubes of a pair of more or less conventional type heat exchangers 7 and 8. From the tubes of heat exchanger 8 a pipe 9 leads into the upper portion of a separating chamber 10. A pressure reducing valve 11 is mounted in pipe 9, preferably at a point closely adjacent to separating chamber 10. From the top of separating chamber 10, a pipe 12, having a valve 13 therein, leads to the shell of heat exchanger 7, which is provided with an exit pipe 14. A pipe 15, having a valve 16 therein, controlled by a conventional liquid level controller 17, leads from separating chamber 10 at a point intermediate the top and bottom thereof. A pipe 18, having a valve 19 therein controlled by another liquid level controller 20, leads from the bottom of separating chamber 10 and connects into pipe 6 at a point in advance of heat exchanger 7. A pump 21 is interposed in pipe 18 between separating chamber 10 and pipe 6 and a valve 22 is mounted in pipe 18 between the pump and the separating chamber. A valved drain pipe 23 is connected to pipe 18 at a point between valves 19 and 22. A pipe 24, having a valve 25 therein, leads from a tank 26 and connects into pipe 18 between pump 21 and valve 22. A pipe 27 connects into the shell of heat exchanger 8, which is provided with an exit pipe 28.

The above described apparatus is employed in the following manner in conducting the process of this invention:

Gas, containing desirable liquefiable constituents, such as propane, butanes, pentanes, and heavier hydrocarbons ordinarily present in natural gas, and under a high pressure within the retrograde condensation range of these constituents, is drawn from well 1 through pipe 2 and under control of valve 3 into scrubber 4. The pressure of the gas under these conditions is above 700 pounds per square inch and may be as high as 3000 pounds per square inch or more. The gas when it leaves the bottom of the well will ordinarily contain water, which, at the pressure and temperature existing in the well, will be in the vapor phase in the gas. As the gas flows from the bottom of the well to the top, the temperature of the gas, which may be 200° F. or higher at the bottom of the well, will be reduced by heat exchange with the cooler strata as it approaches the top of the well, and some of the water will be condensed and remain in the well. However, at the top of the well, a certain amount of water vapor will remain in solution in the gas in an amount which is determined by the pressure and the temperature of the gas at the top of the well. This water vapor will remain in the gas until removed in subsequent steps of the process, as will later be described.

As the gas flows through scrubber 4, any mechanically entrained water and gas condensate will separate from the gas and will collect in the bottom of the scrubber to be withdrawn therefrom through pipe 5. The gas, freed of entrained material, then flows through pipe 6, thence in series through the tubes of heat exchangers 7 and 8, wherein the gas is further cooled, in a manner to be more fully described hereinafter, and from heat exchanger 8, the gas flows through pipe 9 into separating chamber 10. Before entering separating chamber 10, the pressure on the gas is reduced by means of pressure reducing valve 11. The amount of pressure reduction thus effected will be an amount which is substantially only within the retrograde condensation range of the desirable liquefiable constituents at the temperature to which the gas will be finally cooled, both by the cooling effected in heat exchangers 7 and 8 and by the final cooling resulting from the expansion of the gas in separating chamber 10 as a result of the reduction in pressure. It will be noted that the initial pressure of the gas, except for such reduction as occurs from pressure drop in passage through the apparatus, is maintained throughout the cooling steps conducted in heat exchangers 7 and 8 and that this pressure is reduced only after the gas has been cooled in these heat exchangers.

Under these pressure conditions and at the temperature to which the gas is cooled in effecting the recovery of the desired constituents, the water vapor present in the gas tends to form crystalline hydrates of at least some of the constituents of the gas, and these hydrates tend to clog the apparatus and greatly reduce the efficiency of the heat exchange in exchangers 7 and 8. To dehydrate the gas and to thus inhibit hydrate formation, a quantity of a suitable dehydrating agent, preferably of relatively high specific gravity and substantially immiscible with the gas constituents, such for example as concentrated aqueous solution of calcium chloride, is drawn by means of pump 21 from tank 26, in which a supply thereof is maintained, through pipe 24 and valve 25 and is discharged through pipe 18 into pipe 6 in which the agent is intimately mixed with the high pressure gas and absorbs the water vapor therefrom, thus dehydrating the gas and inhibiting hydrate formation.

The dehydrating agent accompanies the gas stream in its flow through heat exchangers 7 and 8 and pipe 9 into separating chamber 10. Upon discharge of the cooled mixture through pressure reducing valve 11 into separating chamber 10, the final cooling incident to the expansion of the gas will cool the gas to the final desired temperature at which the desired constituents of the gas will condense and will separate from uncondensed gas and fall to the bottom of separating chamber 10. The dehydrating agent will also fall to the bottom of the chamber and since it is of greater specific gravity than the gas condensate and substantially immiscible therewith, it will collect in the bottom of separating chamber 10 in a pool which will underlie the condensed gas constituents. The resulting levels in chamber 10 of the dehydrating agent and of the gas condensate are respectively designated in the drawing by the broken lines 29 and 30.

The condensed gas constituents are continuously withdrawn from separating chamber 10 through pipe 15 and valve 16 at a rate controlled by liquid level controller 17. The dehydrating agent is likewise continuously withdrawn from the bottom of separating chamber 10 through pipe 18 and valve 19 by means of pump 21 which discharges the withdrawn dehydrating agent to pipe 6 for recycling in the system. The rate at which the dehydrating agent is withdrawn from chamber 10 is controlled by means of liquid level controller 20 to maintain a constant level of the agent in the chamber. As the dehydrating agent circulates through the process it becomes diluted by the water which it absorbs from the gas, and from time to time a portion of the dilute agent may be withdrawn from the system through pipe 23 and sent to a suitable reconcentrator if desired, or entirely removed from the process. To maintain a constant supply of dehydrating agent of suitable quality, fresh material is added to the system from tank 26 as previously described.

As noted above, the expansion of the gas through valve 11 into separating chamber 10 cools the gas to the final desired temperature and condenses the desired constituents, which, together with the dehydrating agent, separate from uncondensed gas in the separating chamber. The uncondensed gas, which is now at a low temperature, is discharged from the top of the separating chamber and flows through pipe 12 to the shell of heat exchanger 7 where it serves to partially cool the mixture of raw gas and dehydrating agent introduced into the tubes of the exchanger from pipe 6. The uncondensed gas, after passing through heat exchanger 7, is discharged therefrom through pipe 14 to be further employed in any desired manner. The uncondensed gas may be sent to a compressor (not shown), which recompresses the gas to a pressure somewhat above its original pressure and returns it to the subsurface stratum from which it was drawn originally for repressuring this stratum, or to another formation, such as an oil producing formation, to aid in the production of oil, or it may be used for any other purpose for which high pressure gas may be useful.

Intermediate cooling of the raw gas is effected in heat exchanger 8 by means of any suitable refrigerating medium which is introduced into the shell of exchanger 8 through pipe 27 and discharged therefrom through pipe 28 after further cooling the stream of raw gas and dehydrating agent flowing through the tubes of the exchanger en route to separating chamber 10 as previously described. Various refrigerating mediums may be utilized in heat exchanger 8, such as expanded liquid propane, or ammonia, or refrigerated brines.

Since the dehydrating agent has been cooled to a very low temperature in its passage through heat exchangers 7 and 8 and by the expansion of the gas in separating chamber 10, it serves, upon recirculation directly from the separating chamber to pipe 6, as an additional cooling medium for cooling the raw gas to the desired temperature and thus reduces the cost of refrigeration for the cooling steps conducted in heat exchanger 8.

In one specific plant operated in the manner heretofore described, the temperature of the gas leaving the well was about 110° F. Sufficient cold dehydrating agent from separating chamber 10 was circulated in the system to lower the temperature of the gas entering heat exchanger 7 to about 95° F. Heat exchange with the expanded gas in exchanger 7 further reduced the temperature of the gas to about 46° F. and intermediate cooling with expanded ammonia in heat exchanger 8 additionally reduced the temperature of the gas to 24° F. from which the gas was cooled to a final temperature of 9° F. by expansion through valve 11 from an intial pressure of 1350 pounds per square inch to a final pressure of 1150 pounds per square inch. About 90 percent of the propane and heavier constituents contained in the raw gas was condensed and withdrawn as product from separating chamber 10. No hydrate formation occurred in the apparatus.

As noted above, and as disclosed in my earlier application, Serial Number 160,192, the recovery of desirable liquefiable constituents from the raw gas is effected by cooling the gas, while reducing the pressure substantially only within the retrograde condensation range of the constituents. Thus in processing a gas which is initially at a high pressure within the retrograde condensation of the desired constituents, i. e., above 700 pounds per square inch, it is sufficient to reduce the pressure only within this limited range to effect substantially complete condensation of the desired constituents by cooling of the gas to a suitable temperature. This temperature generally ranges from about −5° F. to 40° F., but may be higher or lower depending largely upon the nature of the constituents to be recovered and upon the pressure it is found most economical to employ. By reducing the pressure within the specified limited range, only a minimum amount of the initial pressure of the gas is dissipated, and the resulting relatively high pressure of the residue gas permits economical recompression thereof for return to sub-surface strata. Pressure reduction within the retrograde condensation range is absolutely essential for the condensation of maximum quantities of desirable constituents, otherwise these constituents would remain in the vapor phase under the high pressure conditions set forth, regardless of the extent of cooling applied to the gas. This effect was described in detail in the referred-to earlier application.

The injection into the high pressure gas of a relatively high specific gravity dehydration liquid which is substantially immiscible with the gas and the condensed constituents thereof, while injected primarily for the purpose of dehydrating the gas and inhibiting hydrate formation, also serves the additional purpose of providing another valuable cooling medium for the gas as previously described, and appears to have still another valuable function, which is due to its relatively high specific gravity. When the mixture of gas and dehydrating agent is introduced into separating chamber 10, the expansion of the gas under the extreme pressure conditions described, tends to finely atomize the gas constituents which are condensed by the final cooling incident to the expansion of the gas, and a substantial proportion of the condensate, in this finely atomized state, tends to remain entrained in the uncondensed gas. However, the relatively high specific gravity dehydrating agent, present at the point of expansion, appears to act as a mechanical scrubber and appears to coalesce the fine condensate particles and wash them from the uncondensed gas and thus prevent their loss. Upon precipitation of the dehydrating agent and gas condensate in the lower portion of the separating chamber, the relatively large difference in the specific gravities of the gas condensate and the dehydrating agent results in a quick settling and clean separation of the dehydrating agent from the gas condensate. The dehydrating agent found to be most satisfactory for use in this process is a concentrated solution in water of calcium chloride, preferably a solution of about 35° Bé. Other salts of similar nature may be used successfully.

The step of maintaining the initial pressure from the well head through the earlier cooling steps to the point of final pressure reduction, is particularly advantageous in reducing the quantity of water vapor in the gas, which must be removed by the dehydrating agent. While the condensate recovery process could be conducted fairly successfully by first reducing the initial pressure to the final desired pressure at the well head, by manipulation of valve 3, such reduction in pressure would immediately result in the re-evaporation into the gas of at least a part of the water which was condensed from the gas in passage to the top of the well, and would thus increase the water content of the gas passing through the recovery steps of the process and would thereby increase the difficulty and the cost of dehydration of the gas.

Thus in the above specific example, gas at 1350 pounds per square inch and 110° F. will contain about 6.5 gallons of water per million cubic feet, while at 1150 pounds per square inch and 110° F., the gas will contain about 7.5 gallons of water per million cubic feet, or an increase of approximately 15 percent.

As stated in my earlier application, under certain conditions, sufficient cooling of the gas for condensation of the desired constituents may be accomplished solely by expansion of the gas and heat exchange of the cooled expanded gas with the raw gas prior to expansion thereof. However, under most conditions this method of cooling is preferably supplemented by additional cooling effected by an extraneous cooling medium, such as by expansion of ammonia through heat exchanger 8, as above described.

From the foregoing it will be seen that the improved process of this invention comprises a process for the recovery of desirable liquefiable constituents from gas which is initially at a pressure within the retrograde condensation range of said constituents, and which consists in initially cooling the gas to a temperature below its initial temperature, maintaining said initial pressure on the gas during said cooling, thereafter reducing the pressure on the gas substantially only within the retrograde condensation range of said constituents to thereby condense said constituents and dehydrating the gas during said cooling by intimately mixing therewith a relatively high specific gravity liquid dehydrating agent, which is substantially immiscible with the gas constituents and separating the resulting condensed constituents from uncondensed gas and from the dehydrating agent.

What I claim and desire to secure by Letters Patent is:

1. The process of recovering desirable liquefiable constituents from natural gas containing water and which is initially at a high pressure within the retrograde condensation range of said constituents which comprises, intimately mixing with said gas a dehydrating agent which is substantially immiscible with said constituents, cooling the resulting mixture of gas and said agent sufficiently to condense said constituents, maintaining said high pressure on said gas during said cooling, thereafter reducing said high pressure substantially only within the retrograde condensation range of said constituents at the reduced temperature, and separating the resulting condensed constituents from uncondensed gas and dehydrating agent.

2. The process of recovering desirable liquefiable constituents from natural gas containing water and which is initially at a high pressure within the retrograde condensation range of said constituents which comprises, intimately mixing with said gas a dehydrating agent which is substantially immiscible with said constituents, precooling the resulting mixture of gas and said agent while under said high pressure to a temperature below the initial temperature of the gas but above the final desired temperature for condensation of said constituents, then reducing said high pressure substantially only within the retrograde condensation range of said constituents at said final temperature to thereby further cool said gas to said final temperature, and separating the resulting condensed constituents from uncondensed gas and said dehydrating agent.

3. The process of recovering desirable liquefiable constituents from natural gas containing water and which is initially at a high pressure within the retrograde condensation range of said constituents which comprises, intimately mixing with said gas a liquid dehydrating agent which is substantially immiscible with said constituents, cooling the resulting mixture below the initial temperature of the gas, maintaining said high pressure on said gas during said cooling, thereafter reducing said high pressure substantially only within the retrograde condensation range of said constituents at the reduced temperature, separating the resulting condensed constituents from uncondensed gas and from said dehydrating agent, utilizing the refrigeration effect produced in the gas by the reduction in pressure to accomplish the aforesaid cooling, and returning the dehydrating agent into said intimate mixing with fresh natural gas entering the process.

4. The process of recovering desirable liquefiable constituents from natural gas containing water and which is initially at a high pressure above 700 pound per square inch which comprises, intimately mixing with said gas a dehydrating agent which is substantially immiscible with said constituents, cooling the resulting mixture to a suitable condensation temperature for said constituents, maintaining said initial pressure on said mixture during said cooling, thereafter reducing the initial pressure within a range above 700 pounds per square inch, and separating the resulting condensed constituents from uncondensed gas and dehydrating agent.

5. The process of recovering desirable liquefiable constituents from natural gas containing water and which is initially at a high pressure above 700 pounds per square inch which comprises, intimately mixing with said gas a dehydrating agent which is substantially immiscible with said constituents, cooling the resulting mixture to a suitable condensation temperature for said constituents, maintaining said initial pressure on said mixture during said cooling, thereafter reducing the pressure substantially only within the retrograde condensation range of said constituents at said condensation temperature but not below 700 pounds per square inch, and separating the resulting condensed constituents from uncondensed gas and dehydrating agent.

6. The process of recovering desirable liquefiable constituents from natural gas containing water and which is initially at a high pressure above 700 pounds per square inch which comprises, intimately mixing with said gas a dehydrating agent, flowing the resulting mixture in a confined stream through a series of cooling zones to cool the gas while the gas is maintained under substantially said initial pressure, finally expanding said gas to a lower pressure above 700 pounds per square inch in an enlarged separating zone to thereby finally cool said gas to the desired condensing temperature, therein separating uncondensed gas from condensed constituents and dehydrating agent, withdrawing said uncondensed gas from said separating zone and passing same through one of said cooling zones in indirect heat exchange relationship with said stream of gas.

7. The process of recovering desirable liquefiable constituents from natural gas containing water and which is initially at a high pressure above 700 pounds per square inch which comprises, intimately mixing with said gas a dehydrating agent, flowing the resulting mixture in a confined stream through a series of cooling zones to cool the gas while the gas is maintained under substantially said initial pressure, finally expanding said gas to a lower pressure above 700 pounds per square inch in an enlarged separating zone to thereby finally cool the gas to the desired condensing temperature, therein separating uncondensed gas from condensed constituents and dehydrating agent, separately withdrawing from said separating zone condensed constituents, uncondensed gas and said dehydrating agent, and continuously circulating dehydrating agent from said separating zone to said stream of gas flowing through said cooling zones.

8. The process of recovering desirable liquefiable constituents from gas containing water and which is initially at a high pressure within the retrograde condensation range of said constituents which comprises, intimately mixing with said gas an aqueous solution of calcium chloride, cooling the resulting mixture sufficiently to condense said desirable constituents, maintaining substantially said initial pressure on said gas during said cooling, thereafter reducing said pressure substantially only within the retrograde condensation range of said constituents at the reduced temperature, and separating the resulting condensed constituents from uncondensed gas and said calcium chloride solution.

9. The process of recovering desirable liquefiable constituents from natural gas containing water and which is initially at a high pressure above 700 pounds per square inch which comprises, intimately mixing with said gas an aqueous solution of calcium chloride, cooling the resulting mixture to a suitable condensation temperature for said constituents, maintaining said initial pressure on said mixture during said cooling, thereafter, reducing the initial pressure within a range above 700 pounds per square inch, and separating the resulting condensed constituents from uncondensed gas and said calcium chloride solution.

10. The process of recovering desirable liquefiable constituents from natural gas containing water and which is initially at a high pressure above 700 pounds per square inch which comprises, intimately mixing with said gas an aqueous solution of calcium chloride, cooling the resulting mixture to a suitable condensation temperature for said constituents, maintaining said initial pressure on said mixture during said cooling, thereafter reducing the initial pressure within a range above 700 pounds per square inch, separa ing the resulting condensed constituents from uncondensed gas and said calcium chloride solution, and returning said calcium chloride solution to the aforesaid intimate mixing with said gas.

WILLIAM H. VAUGHAN.